(12) United States Patent
Ogomi et al.

(10) Patent No.: US 9,729,738 B2
(45) Date of Patent: Aug. 8, 2017

(54) IMAGE READING DEVICE

(71) Applicant: MITSUBISHI ELECTRIC CORPORATION, Chiyoda-ku (JP)

(72) Inventors: Tomokazu Ogomi, Chiyoda-ku (JP); Tomoyuki Miyata, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/314,806

(22) PCT Filed: Sep. 30, 2015

(86) PCT No.: PCT/JP2015/077719
§ 371 (c)(1),
(2) Date: Nov. 29, 2016

(87) PCT Pub. No.: WO2016/052613
PCT Pub. Date: Apr. 7, 2016

(65) Prior Publication Data
US 2017/0187896 A1     Jun. 29, 2017

(30) Foreign Application Priority Data
Oct. 3, 2014   (JP) ................. 2014-204376

(51) Int. Cl.
*G06K 9/00*   (2006.01)
*H04N 1/00*   (2006.01)
(Continued)

(52) U.S. Cl.
CPC .......... *H04N 1/00339* (2013.01); *G07D 7/04* (2013.01); *G07D 7/121* (2013.01); *H04N 1/00588* (2013.01); *H04N 1/0282* (2013.01)

(58) Field of Classification Search
None
See application file for complete search history.

(56) References Cited

U.S. PATENT DOCUMENTS

| 5,739,517 A | 4/1998 | Hoshino et al. |
| 6,839,458 B2* | 1/2005 | Mukai ................. G07D 7/20 382/135 |

(Continued)

FOREIGN PATENT DOCUMENTS

| JP | 7-93843 A | 4/1995 |
| JP | 8-22652 A | 1/1996 |

(Continued)

OTHER PUBLICATIONS

International Search Report issued Jan. 12, 2016, in PCT/JP2015/077719, filed Sep. 30, 2015.

*Primary Examiner* — Hadi Akhavannik
(74) *Attorney, Agent, or Firm* — Oblon, McClelland, Maier & Neustadt, L.L.P.

(57) ABSTRACT

An image reading device including: a magnetic circuit comprising a magnet disposed on one side of a conveyance plane, the magnetic circuit generating a magnetic field in a direction perpendicular to the conveyance plane; a magnetoresistive effect element chip disposed between the magnetic circuit and the conveyance plane and detecting a strength change of a conveyance direction component of the magnetic field in the magnetic reading area when a medium to be read is conveyed on the conveyance plane; a light guide disposed on a side opposite to the magnetic circuit side with respect to the conveyance plane, and irradiating light onto the magnetic reading area on the conveyance plane; and an image forming optical system disposed on the side opposite to the magnetic circuit side with respect to the conveyance plane.

11 Claims, 22 Drawing Sheets

(51) Int. Cl.
*G07D 7/04* (2016.01)
*G07D 7/121* (2016.01)
*H04N 1/028* (2006.01)

(56) References Cited

U.S. PATENT DOCUMENTS

| | | | | |
|---|---|---|---|---|
| 7,281,078 | B2* | 10/2007 | Suzuki | G06F 12/0623 |
| | | | | 382/135 |
| 7,913,831 | B2* | 3/2011 | Kuroiwa | G06Q 20/341 |
| | | | | 194/207 |
| 8,179,576 | B2* | 5/2012 | Hayashi | H04N 1/6033 |
| | | | | 358/1.9 |
| 2006/0137959 | A1* | 6/2006 | Iida | G07D 7/04 |
| | | | | 194/207 |
| 2006/0279280 | A1 | 12/2006 | Minamitani et al. | |

FOREIGN PATENT DOCUMENTS

| | | |
|---|---|---|
| JP | 8-279016 A | 10/1996 |
| JP | 2012-084059 A | 4/2012 |
| JP | 2012-143003 A | 7/2012 |
| WO | 2005/083457 A1 | 9/2005 |

\* cited by examiner

FIG. 2
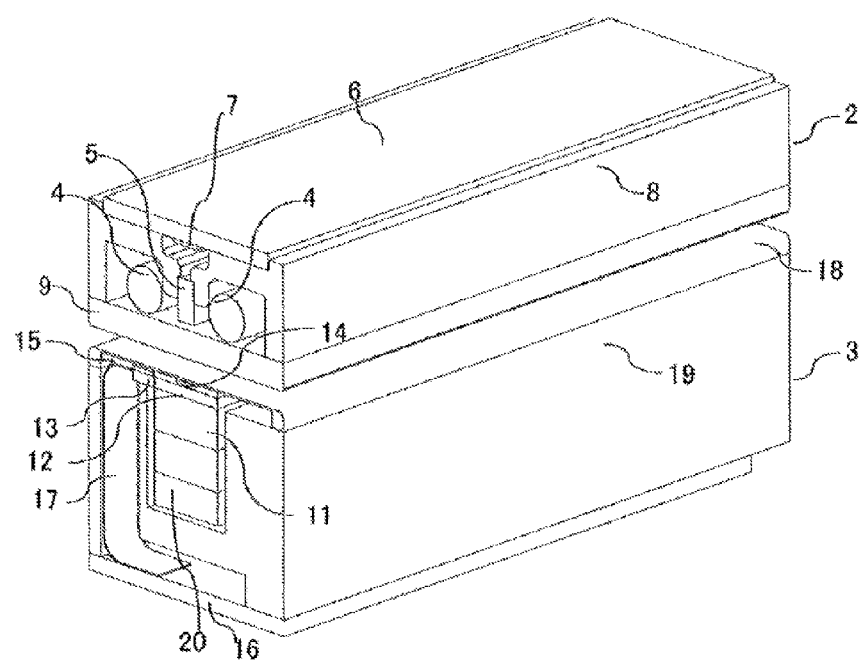
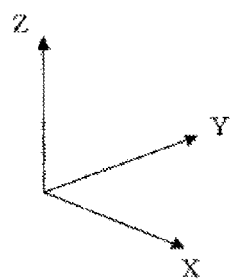

FIG. 4
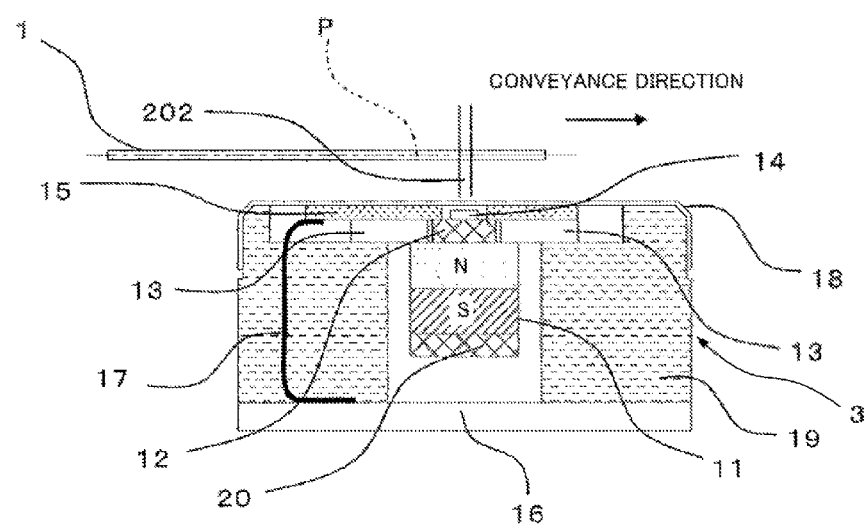
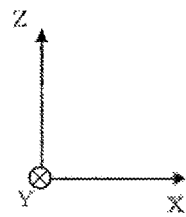

CONVEYANCE DIRECTION

CONVEYANCE DIRECTION

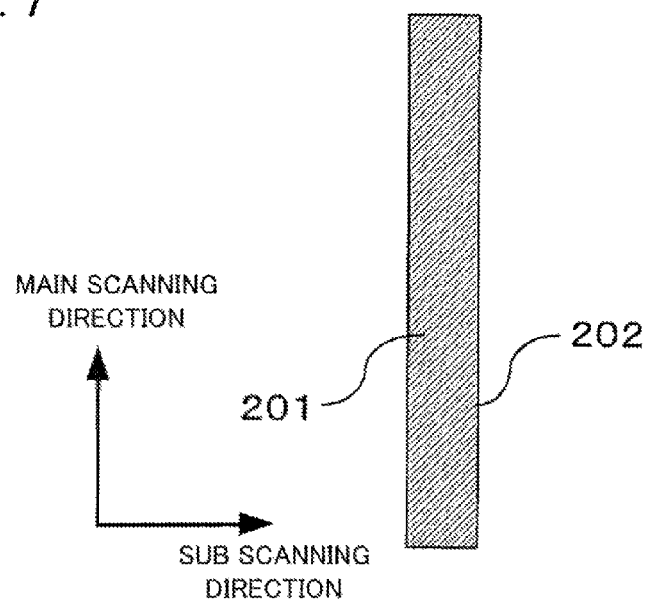
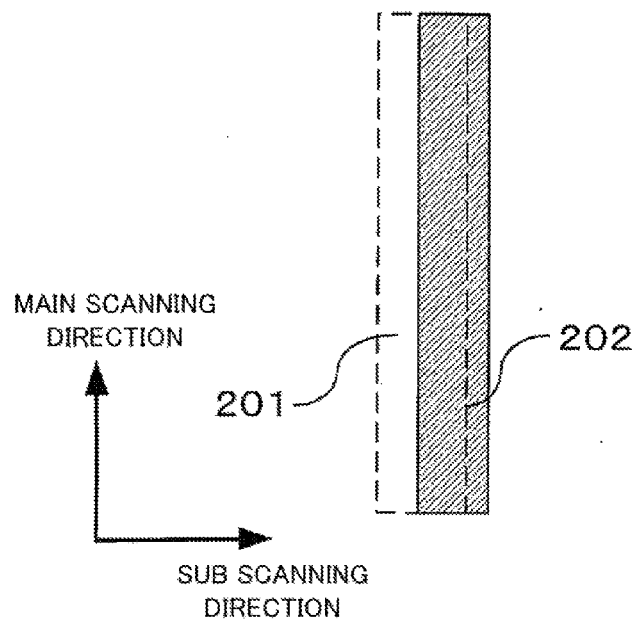

FIG. 14A
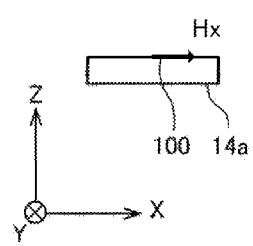
FIG. 14B
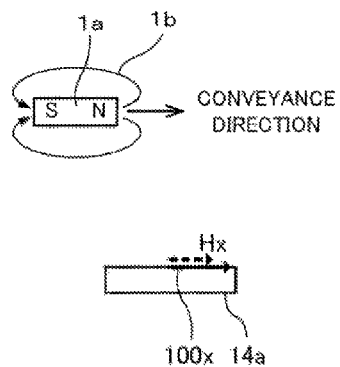
FIG. 14C
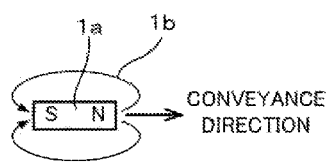
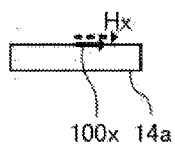
FIG. 14D
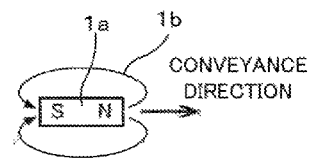
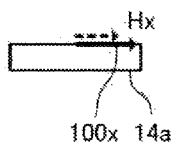

FIG. 20
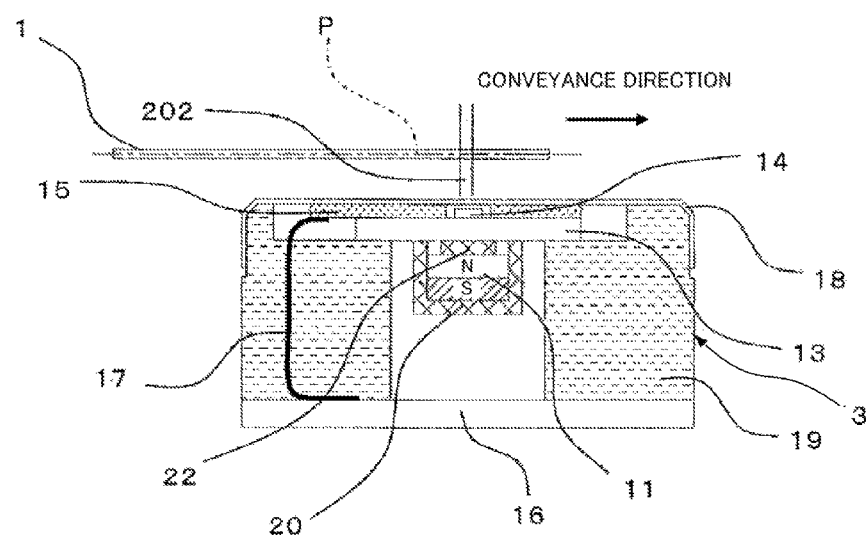
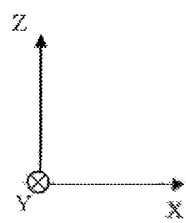

IMAGE READING DEVICE

TECHNICAL FIELD

The present disclosure relates to an image reading including a magnetic reading. More specifically, the present disclosure relates to an image reading device that detects image information and magnetic pattern information (magnetic information) of a sheet-like medium to be read.

BACKGROUND ART

Conventionally, in a device that handles a sheet-like medium to be read such as a banknote or securities such as a check or cash vouchers or the like, for example, an automated transaction device, a bankbook entry machine, an automatic ticket vending machine or the like, sensors such as image reading and magnetic reading sensors are disposed, and various information such as an optical image and a magnetic pattern of a print pattern of a medium to be read is required. For example, in a paper sheet handling device of Patent Literature 1, sensors of an image reading and a magnetic reading are independently disposed in an automated transaction device, and information read in each sensor is handled as information in which positions are mutually unrelated.

Patent Literature 2 discloses, for example, an image reading device that does not include an optical sensor and a magnetic sensor, yet includes a plurality of independent image forming optical systems disposed in the main scanning direction. In the image reading device of Patent Literature 2, a plurality of cells, each having an image forming optical system, are disposed in such a manner that each cell of each column is disposed in a zig-zag pattern in the main scanning direction such that formed images can be complemented among cells. Then, image information imaged in each cell is joined together to make an original image.

CITATION LIST

Patent Literature

Patent Literature 1: Unexamined Japanese Patent Application Kokai Publication No. 2012-84059
Patent Literature 2: Unexamined Japanese Patent Application Kokai Publication No. 2012-143003

SUMMARY OF THE INVENTION

Technical Problem

In a configuration of the paper sheet handling device disclosed in Patent Literature 1, an image reading device and a magnetic reading device are disposed. However, as each reading device is individually disposed, each reading position and each reading range are different each other and acquired information cannot be processed as one piece of related information. In addition, an optical image and a magnetic pattern have no relationship as an image, the optical image and the magnetic pattern cannot be joined as composite of the image information in the image reading device of Patent Literature 2.

The present disclosure is performed card above-mentioned circumstances. The objective of the present disclosure is to provide an image reading device that can associate the read optical image and the read magnetic pattern with the positional relationship of the optical image and the magnetic pattern.

Solution to Problem

In order to achieve the above-mentioned objective, the image reading device according to the present disclosure includes a magnetic circuit having a magnet disposed on one side of a conveyance plane on which a sheet-like medium to be read containing a magnetic component is conveyed along the direction of the sheet surface and the magnet having different magnetic poles in a direction perpendicular to the conveyance plane, and a yoke disposed at the magnetic pole on the side of the conveyance plane of the magnet, wherein the magnetic circuit generates a magnetic field in a first magnetic reading area on the conveyance plane in a direction perpendicular to the conveyance plane;

a magnetoresistive effect element configured to detect a strength change of a conveyance direction component of the magnetic field in the first magnetic reading area when the medium to be read is conveyed on the conveyance plane, the magnetoresistive effect element being disposed between the magnetic circuit and the conveyance plane;

a first light source configured to irradiate light onto the first magnetic reading area on the conveyance plane, the first light source being disposed on a side opposite to the magnetic circuit side with respect to the of conveyance plane; and a first image forming optical system and a first light receiver disposed on the side opposite to the magnetic circuit side with respect to the conveyance plane, wherein the first image forming optical system images at the first light receiver a first optical reading area including at least a portion of the conveyance direction first magnetic reading area on the conveyance plane.

Advantageous Effects of Invention

According to the present disclosure, as the reading area for the reading position of the optical image coincides with the reading area for the magnetic reading position, information of the optical image and the magnetic pattern are simultaneously acquired and can associate the read optical image and the read magnetic pattern with the positional relationship of the optical image and the magnetic pattern. As a result, the identification precision of the medium to be read can be improved.

BRIEF DESCRIPTION OF DRAWINGS

FIG. 2 is a perspective view of the image reading device of Embodiment 1;

FIG. 4 is a cross section perpendicular to the main scanning direction of a magnetic reader of Embodiment 1;

FIG. 7 is a diagram illustrating an optical reading area and a magnetic reading area;

FIG. 8 is a diagram illustrating a modified example of the optical reading area and the magnetic reading area;

FIG. 14A is a magnetic field vector diagram in a magnetoresistive effect element of Embodiment 3;

FIG. 14B is a magnetic field vector diagram when the medium to be read approaches the magnetoresistive effect element;

FIG. 14C is a magnetic field vector diagram when the medium to be read comes to a position of the magnetoresistive effect element;

FIG. 14D is a magnetic field vector diagram when the medium to be read is away from the magnetoresistive effect element;

FIG. 13B is a magnetic field vector diagram when the medium to be read approaches the magnetoresistive effect element;

FIG. 20 is a cross section perpendicular to the main scanning direction of a magnetic reader of Embodiment 5;

DESCRIPTION OF EMBODIMENTS

Hereinafter, figures are used to describe embodiments of the present disclosure. The same reference signs are assigned to the same or equivalent portions in the figures. X-axises, Y-axises, and Z-axises in the figures indicate orthogonal coordinate systems in which origins are set onto the conveyance plane on which the medium to be read is conveyed along the direction of the sheet surface. The X-axis direction (X-axis positive direction) is a conveyance direction of the medium to be read. The Z-axis direction (Z-axis positive direction, Z-axis negative direction) is a direction perpendicular to the sheet surface. The Y-axis direction is a direction perpendicular to the conveyance direction of the sheet surface. The Y-axis direction is a main scanning direction of the image reading device. The conveyance direction of the sheet surface is a sub-scanning direction of the image reading device.

Embodiment 1

Figure 1:
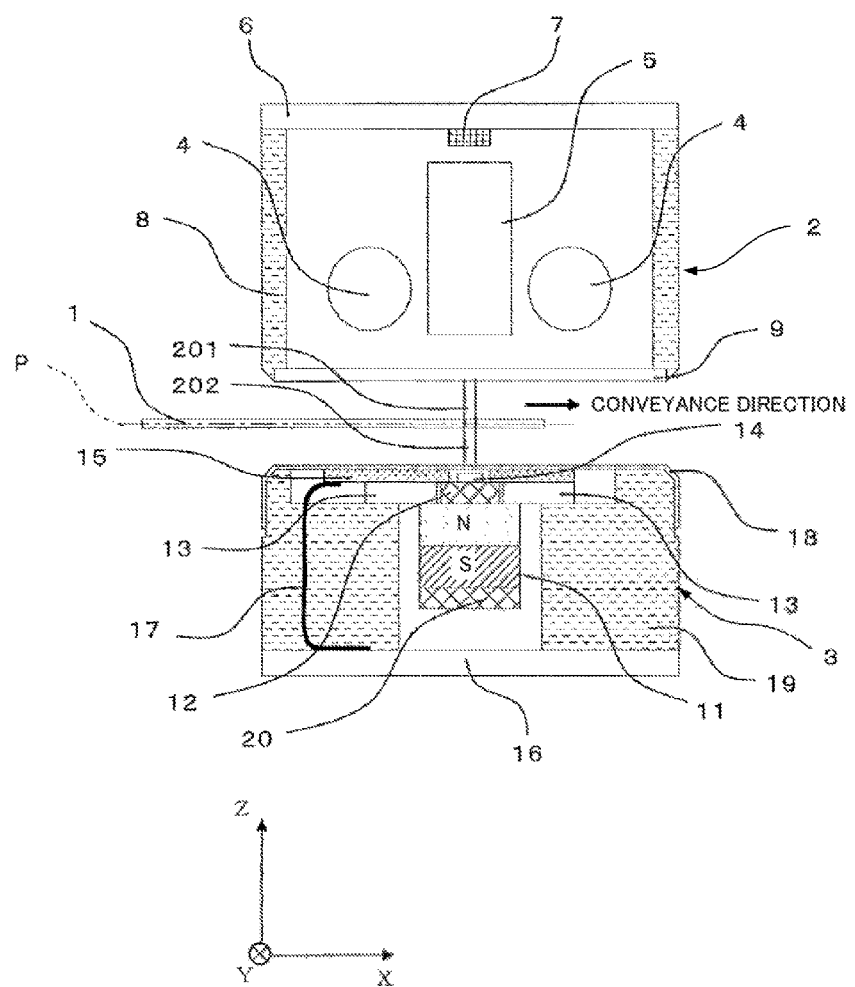
FIG. 1 is a cross section perpendicular to a main scanning direction of an image reading device of Embodiment 1 of the present disclosure.

FIG. 1 is a cross section perpendicular to a main scanning direction of an image reading device of Embodiment 1 of the present disclosure. FIG. 2 is a perspective view of the image reading device of Embodiment 1. The image reading device of the present Embodiment reads not only the optical image but also the magnetic pattern, however, is referred to as an image reading device. However, the main role of the image reading device is not always optical readings, and the sub role of the image reading device is not always magnetic readings.

In the image reading device of Embodiment 1 of the present disclosure, an optical reader 2 is disposed on one side (the upper side, that is, positive side direction of Z-axis in FIG. 1) of the conveyance plane P on which the sheet-like medium 1 to be read containing magnetic components such as a banknote, securities or a check is conveyed along the direction of the sheet surface. A magnetic reader 3 is disposed on another side (the lower side, that is, negative side direction of Z-axis in FIG. 1) of the conveyance plane P.

By the passage of the medium 1 to be read between the optical reader 2 and the magnetic reader 3, the optical reader 2 acquires an optical image of front position information, pattern information and the like of the medium 1 to be read, and the magnetic reader 3 detects a magnetic body in the medium 1 to be read and acquires a magnetic pattern. In addition, the magnetic body in the medium 1 to be read includes a matter printed in magnetic ink. In other words, the magnetic body in the medium 1 to be read also includes a matter existing on the surface of the medium 1 to be read. A surface on which the medium 1 to be read is conveyed is referred to as the conveyance plane P, and a conveyed direction (a direction from left to right, that is, positive direction of X-axis in FIG. 1) is referred to as a conveyance direction or a sub-scanning direction. A direction parallel to the conveyance plane P and perpendicular to the conveyance direction (the sub-scanning direction) (a direction perpendicular to the paper surface of FIG. 1) is referred to as a main scanning direction. The optical reader 2 acquires an optical image in the main scanning direction (a direction perpendicular to the conveyance direction (sub-scanning direction) that is Y-axis direction) from the medium 1 to be read. The magnetic reader 3 acquires the magnetic pattern in the main scanning direction from the medium 1 to be read.

The optical reader 2 includes a contact image sensor (hereinafter, referred to as a CIS), a camera or a reduction optical system. A configuration of the optical reader 2 is described taking the CIS as an example. In the optical reader 2, a light guide 4, an image forming optical system 5 and a light receiver 7 are stored in a housing 8 and each is retained at a determined position. The light guide 4 includes a light emitting element (not illustrated) such as an LED at an end of the light guide 4 in the main scanning direction. The light guide 4 is a light source that irradiates light from a light emitter on the side surface along the main scanning direction onto an optical reading area 201 of the conveyance plane P. The image forming optical system 5 converges light emitted from the light guide 4 and then, reflected on the medium 1 to be read, and forms an image at the light receiver 7. The light receiver 7 is mounted on a sensor board 6, and converts into an electrical signal an image in the optical reading area 201 imaged by the image forming optical system 5. The conveyance plane P side of the housing 8 is covered with a transmission body 9 formed of glass or an acrylic board or the like that permeates light emitted from the light guide 4 and light reflected by the medium 1 to be read. The transmission body 9 protects the light guide 4, the image forming optical system 5 and the light receiver 7.

The magnetic reader 3 includes a magnet 11 in which a N pole and a S pole are aligned in a direction perpendicular to the conveyance plane P, the N pole in +Z-axis direction and the S pole in −Z-axis direction, a yoke (magnetic carrier) 12 a yoke 20, a nonmagnetic carrier 13, a magnetoresistive effect element chip (MR chip) 14, and a board 15 to which output terminal of the MR chip 14 is connected. The yoke (magnetic carrier) 12 is disposed at an end face facing the conveyance plane P on the conveyance plane P side of the magnet 11, and the MR chip 14 is mounted on the yoke 12. The board 15, an amplifier IC (not illustrated) that amplifies the output of the MR chip 14, and the like are mounted on the nonmagnetic carrier 13. The yoke 20 is disposed to contact a side surface on the side away from the conveyance plane P of the magnet 11. The yoke 12 and the yoke 20 are disposal to improve magnetic field uniformity. In addition, a magnetic circuit includes the magnet 11, the yoke 12 and the yoke 20. Of course only the magnet 11 may be the magnetic circuit. In addition, a configuration in which the magnetic circuit is removed from the magnetic reader 3 may be referred to as the magnetic reader 3, and only the MR chip 14 may be referred to as a magnetic reader 3.

The MR chip 14 is mounted on the conveyance plane P side of the yoke 12, and detects a strength change of the conveyance direction component of the magnetic field in a magnetic reading area 202 on the conveyance plane P. The MR chip 14 detects magnetic information (magnetic pattern information) of magnetic reading area 202 and electrically outputs as a change of a resistance value. An electrical signal output from the MR chip 14 is transmitted to a signal processing board 16 via the amplifier IC (not illustrated) amplifying the output and the board 15 through a signal line 17. The signal processing board 16 processes the electrical signal output from the MR chip 14 and outputs the magnetic pattern information. The magnet 11, the yoke 12, the yoke 20, the nonmagnetic carrier 13, the MR chip 14, the board 15 and the signal line 17 are stored in a housing 19 and are held at determined positions. The signal processing board 16 is attached on the opposite side of the conveyance plane P of the housing 19. The conveyance plane P side of the housing 19 is covered with a cover 18 of a non-magnetic body protecting the MR chip 14.

Figure 3:
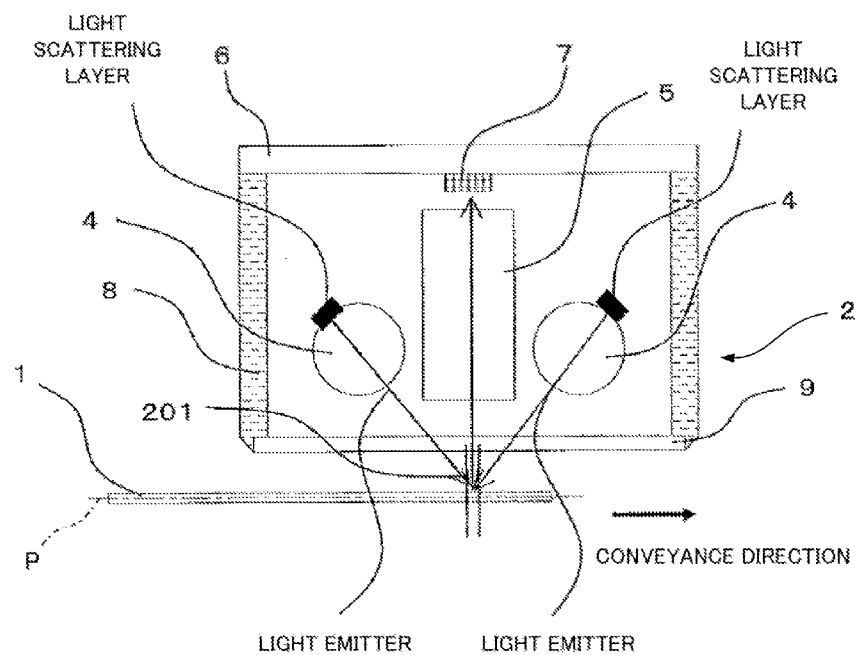
FIG. 3 is a cross section perpendicular to the main scanning direction of an optical reader of Embodiment 1.

FIG. 3 is a cross section perpendicular to the main scanning direction of the optical reader of Embodiment 1. FIG. 3 is a figure in which the optical reader 2 of FIG. 1 is magnified. Light, emitted from the LED (Not illustrated) disposed at an end in the main scanning direction of the light guide 4, enters the light guide 4 and propagates in the light guide 4 in the main scanning direction. A shape of a section of the light guide 4 is a perfect circle or an approximate circle, and a light scattering layer (a light scattering area) in which light scatters of reflects along the main scanning direction is formed in the light guide 4. The light scattering layer includes a white silk-screen printed pattern or a white vapor deposition pattern formed on the surface of the light guide 4. As other methods, a light scattering layer may be formed in a method of disposing cutting groove in the light guide 4 or a method of roughening the surface of the light guide 4. The light scattering layer is formed by appropriately adjusting the pattern shape and the pattern pitch such that uniform light radiation can be acquired over in the main scanning direction.

Light passing through an interior light guiding path of the light guide 4 scatters at the light scattering layer. The light is radiated towards the medium 1 to be read side from the emitter (the light emitter) of a portion facing the light scattering layer with respect to the center axis in the light conveyance direction of the light guide 4, and the light emitted from the light guide 4 irradiates the optical reading area 201 of the conveyance plane P (the medium 1 to be read).

The light irradiating the optical reading area 201 is reflected by the medium 1 to be read, enters as scattered light the image forming optical system 5 which is an image forming optical system, is concentrated at the image forming optical system 5, and the optical reading area 201 is imaged in the light receiver 7. Light of an image of the imaged optical reading area 201 is received at a photodiode or the like, and is converted into an electrical signal in the light receiver 7. The electrical signal output from the light receiver 7 is signal-processed at the sensor board 6, and an optical image of the optical reading area 201 can be acquired.

Figure 5:
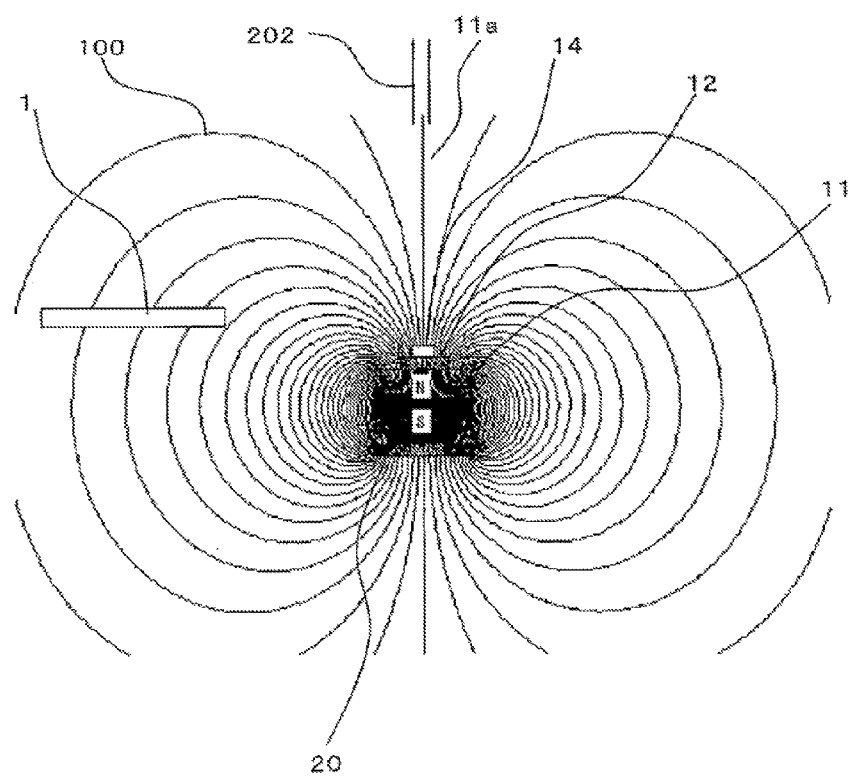
FIG. 5 is a magnetic figure in a section perpendicular to the main seaming direction of the magnetic reader of Embodiment 1.

FIG. 4 is a cross section perpendicular to the main scanning direction of the magnetic reader of Embodiment 1. FIG. 4 is a figure in which the magnetic reader 3 of FIG. 1 is enlarged. FIG. 5 is a magnetic figure in a section perpendicular to the main scanning direct of the magnetic reader of Embodiment 1.

Lines of magnetic force 100 emitted from the magnetic 11 are emitted from the N pole of the magnet 11 into the air through the yoke 12. The lines of magnetic force 100 concentrate on the yoke 12 disposed at the N pole portion of the magnet 11, and the magnetic flux density in the vicinity of the top surface of the yoke 12 (the vicinity of conveyance path side end portion of the magnet 11) increases. The lines of magnetic force 100 emitted in the air from the yoke 12 enter into the yoke 20, and return to the S pole of the magnet 11. An area of a space through which the lines of magnetic force 100 pass is reduced by using the yoke 12 and the yoke 20 having such a shape. Thus, a large magnetic flux density can be acquired.

Figure 6A:
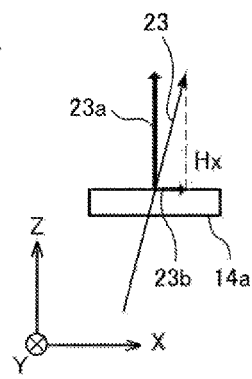
FIG. 6A is a magnetic field vector diagram in a magnetoresistive effect element of Embodiment 1.
Figure 6B:
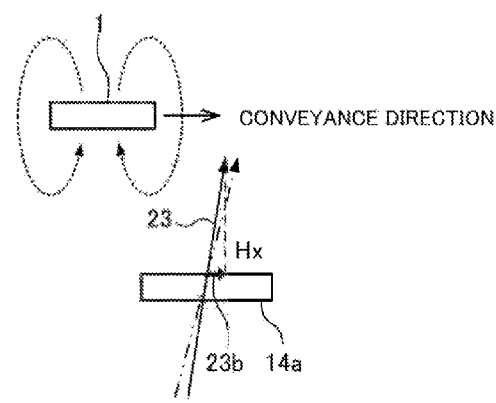
FIG. 6B is a magnetic field vector diagram when a medium to be read approaches the magnetoresistive effect element.
Figure 6C:
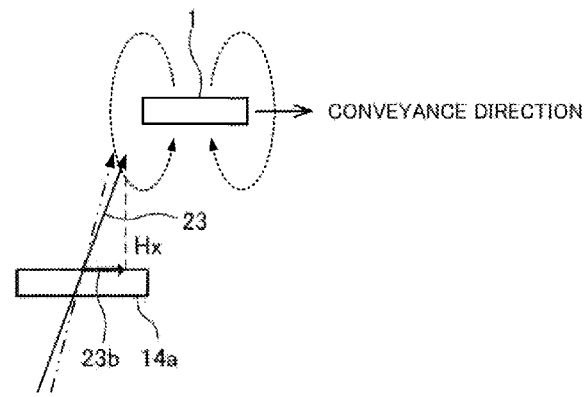
FIG. 6C is a magnetic field vector diagram when the medium to be read is away from the magnetoresistive effect element.

The detection principle of the magnetic reader 3 is described using FIGS. 6A to 6C. A magnetic field vector (magnetic flux density) 23 indicates a direction of the line of magnetic force 100 at the position of the MR chip 14. A vertical direction component 23a indicates a component perpendicular to the conveyance plane P of the magnetic field vector 23. A conveyance direction component 23b indicates the component (Hx) of the conveyance direction of the magnetic field vector 23.

The lines of magnetic force 100 emitted the air are distributed in a shape spread over right and left of a centerline 11a of the magnet 11 in a section perpendicular to the main scanning direction. An MR element 14a (not illustrated) on the MR chip 14 of FIG. 5 is disposed at a position a little bit shifted from the centerline 11a in the conveyance direction. The large direction component 23a and at the same time the small conveyance direction component 23b of the magnetic flux density are present in the MR element 14a. Hereinafter, functions of the magnetic reader 3 are described.

In Embodiment 1, the large vertical directions component 23a and at the same time the small conveyance direction component 23b of the magnetic flux density are present at the disposed position of the MR element 14a. This is because the MR element 14a is considered to be disposed at a position slightly away from the centerline 11a of the magnet 11. A bias magnetic field of the conveyance direction necessary appropriately operating the MR element 14a can be given to the MR element 14a by disposing the MR element 14a in this way.

When the medium 1 to be read including a magnetic body passes in such a state, the magnetic field distribution changes. At this moment, the direction of the magnetic field vector 23 applied to the MR element 14a slightly changes. Even if the change in the direction of the magnetic field vector 23 is slight, a large change occurs as a change rate of the conveyance direction component 23b, and thus this change can be fully detected using the MR element 14a.

FIG. 6A is a magnetic field vector diagram in a magnetoresistive effect element of Embodiment 1. In the vicinity where the MR element 14a is disposed, the vertical direction component 23a of an intersection magnetic field, indicated by the lines of magnetic force 100, intersecting the conveyance plane P a dominant component of the vector. As the MR element 14a is shifted a little bit from the centerline 11a of the magnet, as illustrated in FIG. 6A, the magnetic field vector 23 is slightly inclined from the vertical direction to the conveyance direction. The conveyance direction component 23b of this magnetic field functions as the bias magnetic field of the MR element 14a.

FIG. 6B is a magnetic field vector diagram when the medium to be read approaches the magnetoresistive effect element. When the medium 1 to be read including a magnetic body approaches the magnetic reading area 202, as illustrated in FIG. 6B, the magnetic field vector 23 is inclined to the medium 1 to be read side like being attracted to the medium 1 to be read. Therefore the conveyance direction component 23b of the magnetic field vector 23 decreases. In FIG. 6B, the magnetic field vector 23 without the medium 1 to be read being present is illustrated in two-dot chain line.

FIG. 6C is a magnetic field vector diagram when the medium to be read is away from the magnetoresistive effect element. Also in FIG. 6C, the magnetic field vector 23 without the medium 1 to be read being present illustrated in two-dot chain line. When the medium 1 to be read is away from the magnetoresistive effect element, as illustrated in FIG. 6C, as the magnetic field vector 23 is inclined to the medium 1 to be read side such that the magnetic field vector 23 is pulled by the medium 1 to be read the conveyance direction component 23b increases. A resistance value of the MR element 14a that senses magnetism of the conveyance direction component 23b changes by the magnetic body of the medium 1 to be read moving in the conveyance direction. Therefore, as the conveyance direction component 23b in the conveyance direction changes due to the passage of the medium 1 to be read, a resistance value of the MR element 14a that senses magnetism of the conveyance component changes and the magnetic component of the medium 1 to be read can be detected.

As the change of this magnetic field vector 23 is brought due to the passage of the magnetic body of the medium 1 to be read, such a configuration can detect the image of the medium 1 to be read. As a result, a slight change of the magnetic field caused by the medium 1 to be read can be read.

FIG. 7 is a diagram illustrating the optical leading area and the magnetic reading area. The light receiver 7 and the MR chip 14 extend in the main scanning direction. The optical reading area (the to-be-irradiated area) 201 and the magnetic reading area 202 have elongated shapes in the main scanning direction. In FIG. 1 and FIG. 7, the optical reading area 201 (to-be-irradiated area) of the optical reader 2 and the magnetic reading area 202 of the magnetic reader 3 are equal and co-exist in the same area. Therefore, the light guide 4 irradiates light onto the magnetic leading area 202 of the conveyance plane P. Image information and magnetic information of the same place can be acquired at the same time due to the reading areas being equal and co-existing in the same area in this way. Thus the read optical image and the read magnetic pattern and the positional relationship of the optical image and the magnetic pattern can be associated. As a result, accurate information can be acquired.

FIG. 8 is a diagram illustrating a modified example of the optical reading area and the magnetic reading area. In FIG. 8, although the magnetic reading area 202 of the magnetic reader 3 and the optical reading area 201 (to-be-irradiated area) of the optical reader 2 co-exist in the same area in the main scanning direction, the optical reading area 201 is shifted from the magnetic reading area 202 in the conveyance direction, and a portion is overlapped. The magnetic reading area 202 of the magnetic reader 3 and the optical reading area 201 (to-be-irradiated area) of the optical reader 2 do not totally co-exist in the same area. However, as there is an overlapped area in the conveyance direction, regarding the overlapped area, image information and magnetic information of the same location can be acquired at the same time. Therefore accurate data without error between the optical image and the magnetic pattern can be acquired, and compatibility is determination of the medium to be reads 1 such as a banknote or securities can be performed. In addition, similar functions and effects can be performed also when the optical reading area 201 (to-be-irradiated area) of the optical reader 2 and the magnetic reading area 202 of the magnetic reader 3 are deviated and partially overlapped in the main scanning direction.

In addition, in Embodiment 1, an example using a CIS for the optical reader 2 is described. The optical reader 2 of Embodiment 1 is not limited to the CIS. As the optical reader 2, an optical system, in which the optical reading area 201 is reduced and imaged onto an image sensor such as a CCD (charge coupled device) image sensor or a CMOS image sensor, may be used.

Embodiment 2

Figure 9:
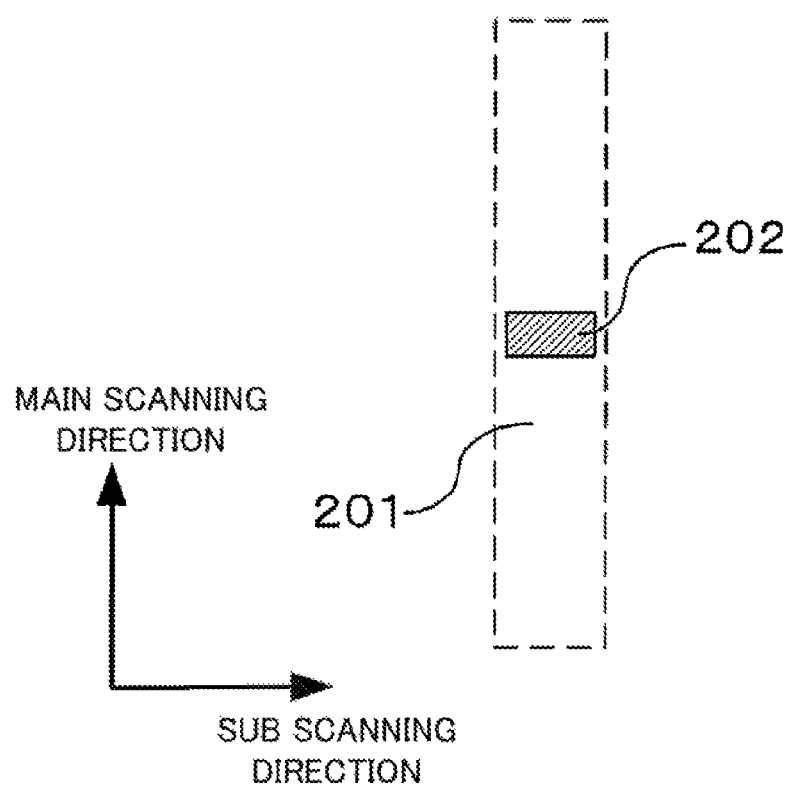
FIG. 9 is a diagram intimating an optical reading area and a magnetic reading area of Embodiment 2 of the present disclosure.

FIG. 9 is a diagram illustrating an optical reading area and a magnetic reading area of Embodiment 2 of the present disclosure. In FIG. 9, the magnetic reading a 202 of the magnetic reader 3 occupies a portion of the optical reading area 201 in the main scanning direction. When there is no need to read the medium 1 to be read the whole main scanning direction in such cases as:

when a magnetic information portion of a banknote or securities is limited to a portion of the medium 1 to be read;

when a portion to be determined in the magnetic information portion is limited; or the like, the configuration illustrated in FIG. 9 can limit the magnetic reading area 202 of the magnetic reader 3 to an area in which the magnetic body is assumed to pass by. The size of the magnetic reader 3 is reduced and the number of parts can be reduced by limiting the magnetic reading area 202. In addition, as the optical reading area 201 of the optical reader 2 and the magnetic reading area 202 of the magnetic reader 3 are overlapped in the sub-scanning directions, functions and effects similar to Embodiment 1 can be acquired.

Embodiment 3

Figure 10:
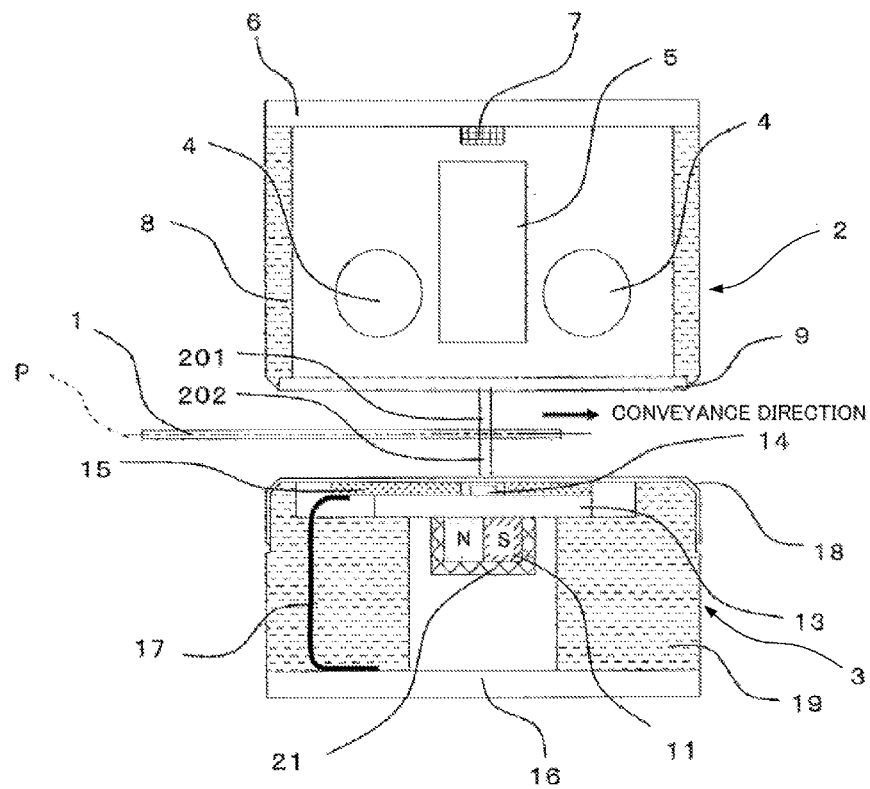
FIG. 10 is a cross section perpendicular to the main scanning direction of an image reading device of Embodiment 3 of the present disclosure.
Figure 11:
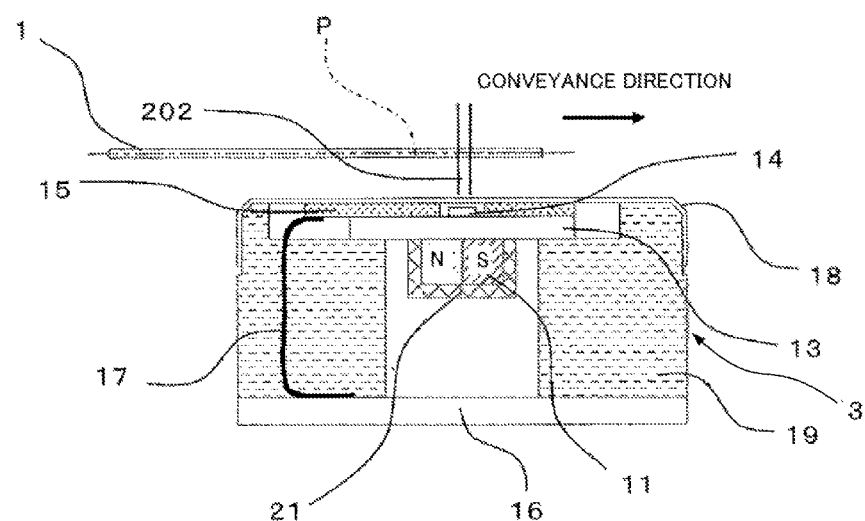
FIG. 11 is a cross section perpendicular to the main scanning direction of a magnetic reader of Embodiment 3.

FIG. 10 is a cross section perpendicular to the main scanning direction of an image reading device Embodiment 3 of the present disclosure. FIG. 11 is a cross section perpendicular to the main scanning direction of a magnetic reader of Embodiment 3. FIG. 11 is a figure in which the magnetic reader 3 of FIG. 10 is enlarged. Embodiment 3 has a configuration in which the magnetic reader 3 of Embodiment 1 is changed, and the configured of the optical reader 2 is similar to that of Embodiment 1.

The magnetic reader 3 of Embodiment 3 is configured for a case in which only a hard magnetic body of the medium 1 to be read is detected. The medium 1 to be read that has a hard magnetic body, a banknote, a check or the like is formed by containment of a hard magnetic material, or is printed in ink including a hard magnetic body. The magnet 11 has a N pole and a S pole aligned in the conveyance direction (X direction), the S pole in the +X direction and the N pole in the −X direction. Viewing the magnet 11 at a plane (XZ plane) perpendicular to the main scanning direction, the yoke 21 is disposed to cover portions except a surface facing the conveyance plane P of the magnet 11. The nonmagnetic carrier 13 is disposed on a surface facing the conveyance plane P of the magnet 11. The magnetoresistive effect element chip (MR chip) 14 is disposed between the nonmagnetic carrier 13 and the medium 1 to be read, and is disposed between the N pole and the S pole of the magnet 11. The output terminal of the MR chip 14 is connected to the board 15. In FIG. 10 and FIG. 11, the MR chip 14 is disposed at a center portion between the N pole and the S pole of the magnet 11.

Figure 12:
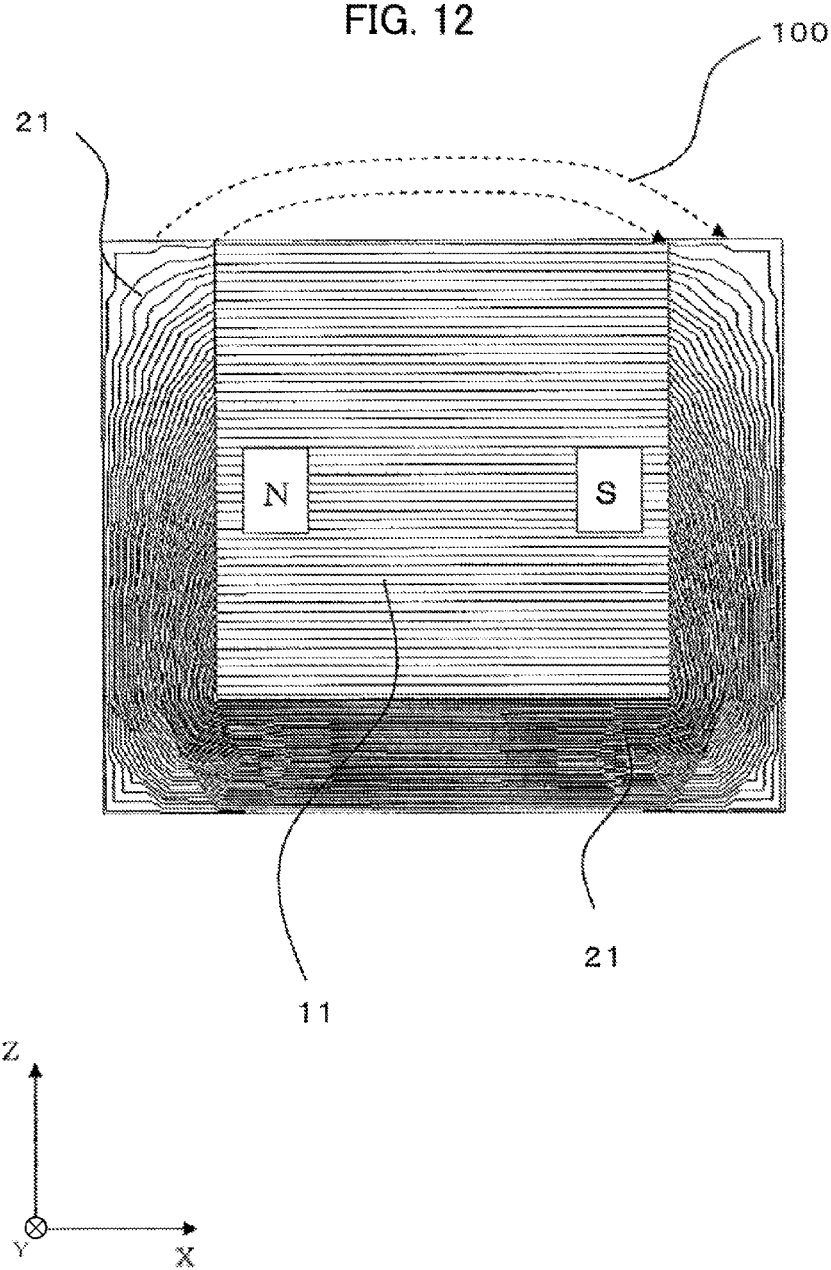
FIG. 12 is a magnetic figure in a section perpendicular to the main scanning direction of the magnetic reader of Embodiment 3.

FIG. 12 is a magnetic figure in a section perpendicular to the main scanning direction of the magnetic reader of Embodiment 3. According to the configuration of the magnetic reader 3 of Embodiment 3, as illustrated in FIG. 12, the lines of magnetic force 100 are a leak magnetic field occurring from the yoke at the N pole end to the yoke at the S pole end of the magnet 11, and almost alone the conveyance direction (X direction). In FIG. 12, the magnetic field emitted from the N pole of the magnet 11 enters the S pole of the magnet 11 through the inside of a yoke 21. In this way, the magnetic field concentrates on the yoke 21 when the circumference of the magnet 11 is covered around with the yoke 21. By the way, as illustrated in FIG. 12, as no yoke is present in the upper side of the magnet 11, a small portion of the line of magnetic force is released into the air, that is, outside the yoke 21. A leak magnetic field occurring from the yoke on the N pole side of the magnet 11 to the yoke on the S pole side of the magnet 11 exists. As the MR chip 14 is disposed at the center portion between the N pole and the S pole of the magnet 11, the magnetic field can be considered to be parallel with the conveyance direction in the magnetic reading area 202. In Embodiment 3 of the present disclosure, this minute leak magnetic field is used as a bias magnetic field.

Figure 13:
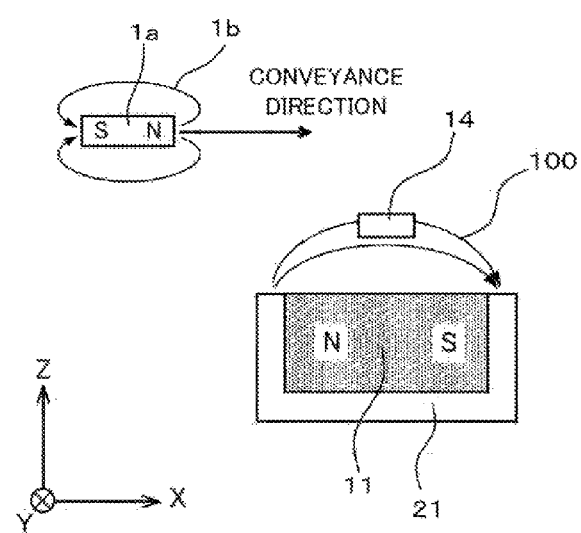
FIG. 13 is a diagram illustrating the detection function of the magnetic reader of Embodiment 3.

FIG. 13 is a diagram illustrating the detection function of the magnetic reader of Embodiment 3. In FIG. 13, a bias magnetic field 100 at the position where the MR element 14a (not illustrated) is disposed on the MR chip 14 changes as a hard magnetic body magnetic field 1b of a preliminarily magnetized hard magnetic body 1a approaches the MR element 14a, and then, goes away. As the bias magnetic field 100 suitable for the operation is given as previously mentioned by the magnet 11 and the yoke 21, the MR element 14a can detect with high sensitivity a change of the bias magnetic field 100 caused by the hard magnetic body 1a. FIGS. 14A to 14D are used for further detailed description.

FIG. 14A is a magnetic field vector diagram in a magnetoresistive effect element of Embodiment 3. FIG. 14B is a magnetic field vector diagram when the medium to be read approaches the magnetoresistive effect element. FIG. 14C is a magnetic field vector diagram when the medium to be read comes to the position of the magnetoresistive effect element FIG. 14D is a magnetic field vector diagram when the medium to be read is away from the magnetoresistive effect element FIGS. 14A to 14D illustrates magnetic field changes describing a detection principle of the magnetic reader of Embodiment 3. In FIG. 13, in the vicinity where the MR chip 14 is disposed, components parallel with the conveyance path of the bias magnetic field 100 formed of the lines of magnetic force 100 is dominant. The X direction component of the bias magnetic field 100 functions as the bias magnetic field 100 of the MR chip 14. This is referred to as an X direction component 100x of the bias magnetic field.

FIG. 14A illustrates the magnitude and the direction of an X direction component Hx of the bias magnetic field 100 when the preliminarily magnetized hard magnetic body 1a is not present. An arrow of the dotted line parallel to the bias magnetic field 100 in FIGS. 14B to 14D illustrates the magnitude of the bias magnetic field 100 in FIG. 14A. For example, as illustrated in FIG. 14A, when the hard magnetic body 1a, preliminarily magnetized in a direction in which a N pole is generated in the +X direction and a S pole is generated in the −X direction, approaches the MR element 14a, as illustrated FIG. 14B, the direction of the X direction component Hx of the bias magnetic field 100 and the direction of the X direction component of the hard magnetic body magnetic field 1b of the held magnetic body 1a become the same direction at the position of the MR element 14a. On that account, the bias magnetic field 100x (Hx) to the MR element 14a increases.

As illustrated in FIG. 14C, when the hard magnetic body 1a comes to the position of the MR element 14a, the direction of the X direction component Hx of the bias magnetic field 100 and the direction of the X direction component of the hard magnetic body magnetic field 1b of the hard magnetic body 1a become the opposite directions at the position of the MR element 14a. Therefore the bias magnetic field 100x (Hx) applied to the MR element 14a decreases. As illustrated in FIG. 14D, when the hard magnetic body 1a leaves from the MR element 14a, the direction of the X direction component Hx of the bias magnetic field 100 and the direction of the X direction component of the hard magnetic body magnetic field 1b of the hard magnetic body 1a become the same direction at the position of the MR element 14a. Therefore the bias magnetic field 100x (Hx) applied to the MR element 14a increases. This changes a resistance value of the MR element 14a that senses magnetism of the X direction component and the hard magnetic body 1a can be detected. In other words, as the hard magnetic body 1a (the medium 1 to be read) passes, the magnitude of the bias magnetic field 100x (Hx) of the conveyance direction (X direction) changes. Thus the resistance value of the MR element 14a that senses the magnetism of the X direction component changes and the hard magnetic body 1a can be detected.

As the change of the bias magnetic field 100 is brought by the passage of the hard magnetic body 1a, the passage of the hard magnetic body 1a can be detected by making such a configuration as Embodiment 3. As a result, the magnetic reader 3 that can read a slight magnetic field change by the hard magnetic body 1a can be provided. If the magnetic reader 3 is constructed in this way, in the vicinity of the MR chip 14, hardly no magnetic field is applied to the medium 1 to be read (the hard magnetic body 1a) such as the banknote by the magnet 11 and the yoke 21. Even when a soft magnetic body 1a that does not produce a magnetic field in itself is included in the medium 1 to be read, the soft magnetic body is not detected. Thus distinguishing a soft magnetic body and a hard magnetic body becomes possible.

By constructing the magnetic reader 3 as described above, the hard magnetic body can be detected with high sensitivity, and furthermore, as the magnetic reader 3 hardly senses the soft magnetic body, a magnetic sensor that can distinguish between a hard magnetic body and a soft magnetic body can be provided.

According to this configuration, almost no magnetic field is applied to the medium 1 to be read. Therefore, as the soft magnetic body that does not produce a magnetic field in itself is not detected, detection of only a hard magnetic body producing a magnetic field in itself becomes possible.

For Embodiment 3 as well, as illustrated in FIG. 10, the optical reading area 201 and the magnetic reading area 202 are equal and co-exist in the same area, and the image information and the magnetic information of the hard magnetic body of the same location can be acquired at the same time. Thus the read optical image and the read magnetic pattern, and the positional relationship of the optical image and the magnetic pattern can be associated. As a result, accurate information can be acquired.

Embodiment 4

Figure 15:
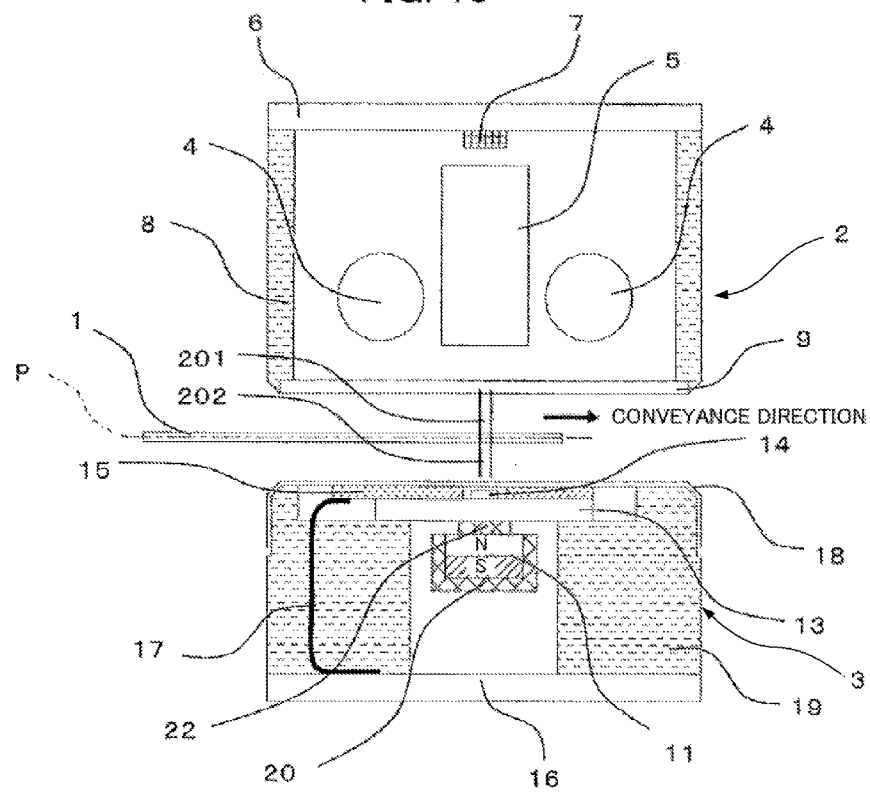
FIG. 15 is a cross section perpendicular to the main scanning direction of an image reading device of Embodiment 4 of the present disclosure.
Figure 16:
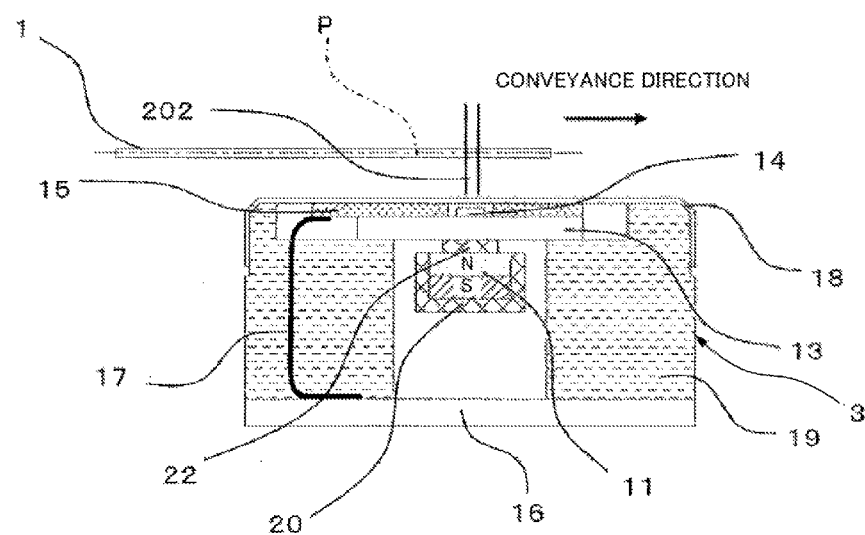
FIG. 16 is a cross section perpendicular to the main scanning direction of a magnetic reader of Embodiment 4.

FIG. 15 is a cross section perpendicular to the main scanning direction of the image reading device of Embodiment 4 of the present disclosure. FIG. 16 is a cross section perpendicular to the main scanning direction of the magnetic reader of Embodiment 4. FIG. 16 is a figure in which the magnetic reader 3 or FIG. 15 is enlarged. Embodiment 4 is an Embodiment in which the configuration of the magnetic reader 3 of Embodiment 1 is changed, and the configuration of the optical reader 2 is similar to that of Embodiment 1.

The magnetic reader 3 of Embodiment 4 is, similar to Embodiment 3, a configuration in a case in which only a hard magnetic body of the medium 1 to be read is detected. The medium 1 to be read has a hard magnetic body such as a banknote, a check or the like that is formed by containment of a hard magnetic material, or that is printed in ink including a hard magnetic body. In FIG. 15, the magnet 11 has different magnetic poles, a N pole and a S pole that are aligned in a direction (Z direction) perpendicular to the conveyance plane P. The N pole is positioned in the +Z direction, and the S pole is positioned in the −Z direction. A yoke 22 is disposed on a surface facing the conveyance plane P of the magnet 11, and the yoke 20 is disposed to cover portions except the surface on which the yoke 22 of the magnet 11 is disposed. In FIG. 15, the MR chip 14 is disposed at the center portion of the yoke 22 on the N pole side of the magnet 11 and of the conveyance direction length, and between the yoke 22 and the conveyance path of the medium 1 to be read.

In the configuration of the magnetic reader 3 of Embodiment 4, the yoke 22 is disposed on the conveyance plane P side of the magnet 11, and the yoke 20 is disposed to cover portions except the surface on which the yoke 22 of the magnet 11 is disposed. Therefore, compared with Embodiment 1, a magnetic field toward the Z direction beyond the yoke 22 from the magnetic pole decreases, and a magnetic field toward the X direction increases.

If the magnetic sensor device is configured in this way, the magnetic field applied to the banknote (hard magnetic body) by the magnet 11, the yoke 22 and the yoke 20 can be suppressed. As a result, distinguishing between a hard magnetic body and a soft magnetic body becomes possible as a detection level of the soft magnetic body that does not produce a magnetic field in itself.

Figure 17:
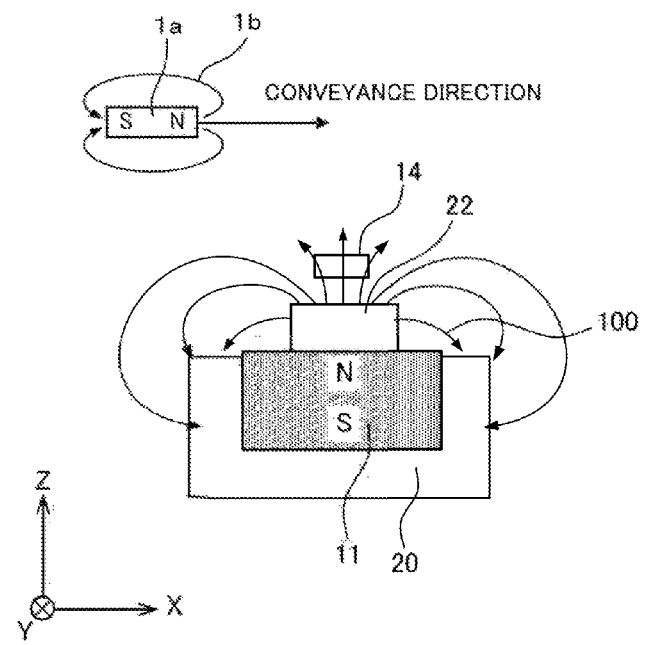
FIG. 17 is a diagram illustrating the detection function of the magnetic reader of Embodiment 4.

FIG. 17 is a diagram illustrating the detection function of the magnetic reader of Embodiment 4. The magnetic reader 3 of Embodiment 4, as illustrated in FIG. 17, uses, for the bias magnetic field 100, a micro-magnetic field toward the yoke 20 in the Z direction beyond the yoke 22 from the magnetic pole. A leak magnetic field at the conveyance plane P of the magnet 11 is extremely small, and the soft magnetic body does not produce a magnetic field. Thus, even if a soft magnetic body approaches the magnetic reading area 202, the bias magnetic field 100 does not change. Therefore, the soft magnetic body is not detected by the magnetic reader 3.

For example, as illustrated in FIG. 17, the hard magnetic body 1a, preliminarily magnetized in a direction in which a N pole is generated in the +X direction and a S pole is generated in the −X direction, spontaneously generates the hard magnetic body magnetic field 1b. Thus, when the hard magnetic body 1a approaches and passes the MR element 14a, the bias magnetic field changes as illustrated in FIGS. 18A to 18D. With reference to FIGS. 18A to 18D, the detection principle of the hard magnetic body 1a in the magnetic reader 3 is described.

Figure 18A:
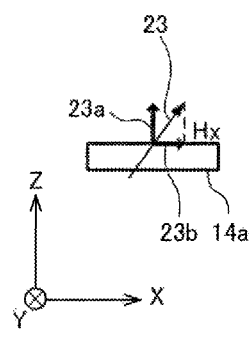
FIG. 18A is magnetic field vector diagram in a magnetoresistive effect element of Embodiment 4.

FIG. 18A is a magnetic field vector diagram in a magnetoresistive effect element of Embodiment 4. The MR element 14a (not illustrated in FIG. 17) on the MR chip 14 of FIG. 17 is disposed at a position shifted slightly in the conveyance direction from the centerline 11a of the conveyance direction of the magnet 11. The vertical direction component 23a and at the same time the conveyance direction component 23b of the magnetic flux density are present in the MR element 14a. In addition, in FIG. 18A, the magnetic field vector 23 slightly inclines to the conveyance direction side, that is, to the +X direction side.

In Embodiment 4, the vertical direction component 23a and at the same time the conveyance direction component 23b of the magnetic flux density are present at the position in which the MR element 14a is disposed. This is because the MR element 14a is disposed at a position slightly away from the centerline 11a of the magnet 11. This arrangement can give the MR element 14a the conveyance direction bias magnetic field necessary to appropriately operate the MR element 14a.

When the medium 1 to be read (the hard magnetic body 1a) including a magnetic body passes in such a state, the magnetic field distribution changes. At this moment, the direction of the magnetic field vector 23 applied to the MR element 14a slightly changes. Even if the change of the direction of the magnetic field vector 23 is slight, a large change as a ratio of the conveyance direction component 23b is generated. Thus this change can be sufficiently detected using the MR element 14a.

In FIG. 18A, in the vicinity where the MR element 14a is disposed, the vertical direction component 23a of the magnetic field vector 23 being an intersection magnetic field intersecting the conveyance plane P and the conveyance direction component 23b of the magnetic field vector 23 have almost the same magnitude. As illustrated in FIG. 18A, as the MR element 14a is shifted a little bit to the conveyance direction from the centerline 11a of the magnet 11, the magnetic field vector 23 is inclined to the conveyance direction from the vertical direction. The conveyance direction component 23b of this magnetic field functions as the bias magnetic field of the MR element 14a.

Figure 18B:
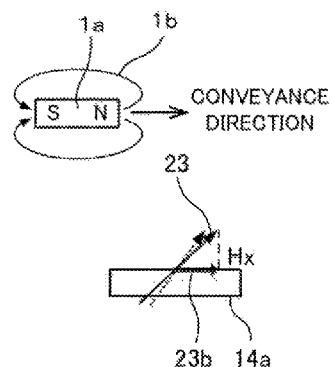
FIG. 18C is a magnetic field vector diagram when the medium to be read comes to a position of the magnetoresistive effect element.
FIG. 18D is a magnetic field vector diagram when the medium to be read is away from the magnetoresistive effect element.

FIG. 18B is a magnetic field vector diagram when the medium to be read approaches the magnetoresistive effect element. For example, as illustrated in FIG. 18B, the direction of the X direction component Hx of the magnetic field vector 23 and the direction of the X direction component of the hard magnetic body magnetic field 1b of the hard magnetic body 1a become the same direction at the position of the MR element 14a when the medium 1 to be read including a magnetic body (the hard magnetic body 1a) preliminarily magnetized in the direction in which a N pole is generated in the +X direction, and a S pole is generated in the −X direction approaches the MR element 14a as illustrated in FIG. 18B. Therefore, the magnetic field vector 23 is added to the hard magnetic body magnetic field 1b of the medium 1 to be read (the hard magnetic body 1a) and inclines to the conveyance direction side (+X direction) to be away from the medium 1 to be read (the hard magnetic body 1a). Therefore the conveyance direction component 23b of the magnetic field vector 23 increases. An arrow of the dotted line illustrated in FIG. 18B indicates the magnetic field vector 23 in a case in which the medium 1 to be read (the hard magnetic body 1a) is not present.

Figure 18C:
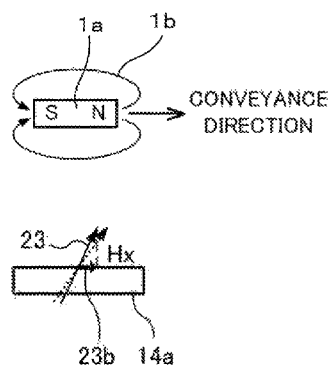

FIG. 18C is a magnetic field vector diagram when the medium to be read comes to the position of the magnetoresistive effect element. An arrow of the dotted line illustrated in FIG. 18C indicates the magnetic field vector 23 when the medium 1 to be read (the hard magnetic body 1a) is not present. As illustrated in FIG. 18C, the direction of the X direction component Hx of the magnetic field vector 23 and the direction of the X direction component of the hard magnetic body magnetic field 1b of the hard magnetic body 1a become the opposite directions at the position of the MR element 14a, when the medium 1 to be read (the hard magnetic body 1a) including a magnetic body comes to the position of the MR element 14a. Therefore, the magnetic field vector 23 is added to the hard magnetic body magnetic field 1b of the medium 1 to be read (the hard magnetic body 1a) and inclines to a side opposite to the conveyance direction (−X direction). Thus the conveyance direction component 23b decreases.

Figure 18D:
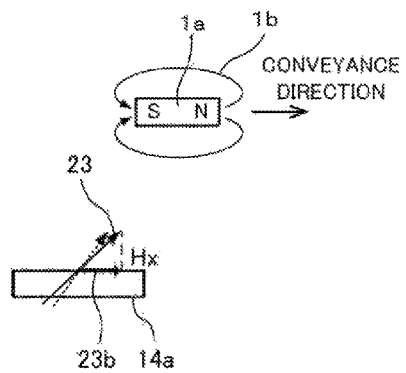

FIG. 18D is a magnetic field vector diagram when the medium to be read is away from the magnetoresistive effect element. An arrow of the dotted line illustrated in FIG. 18D indicates the magnetic field vector 23 when the medium 1 to be read (the hard magnetic body 1a) is not present. As illustrated in FIG. 18D, the direction of the X direction component Hx of the, magnetic field vector 23 and the direction of the X direction component of the hard magnetic body magnetic field 1b of the hard magnetic body 1a become the same direction at the position of the MR element 14a, when the medium 1 to be read (the hard magnetic body 1a) including a magnetic body is away from the MR element 14a. Therefore, the magnetic field vector 23 is added to the hard magnetic body magnetic field 1b of the medium 1 to be read (the hard magnetic body 1a) and inclines to the conveyance direction side (+X direction) as if being attracted by the medium 1 to be read (the hard magnetic body 1a). Therefore the conveyance direction component 23b of the magnetic field vector 23 increases. A movement of the magnetic body of the medium 1 to be read (the hard magnetic body 1a) in the conveyance direction changes the resistance value of the MR element 14a that senses magnetism of the conveyance direction component 23b. Therefore, as the passage of the medium 1 to be read (the hard magnetic body 1a) changes the conveyance direction component 23b of the magnetic field vector 23 in the conveyance direction, the resistive value of the MR 14a that senses magnetism of the conveyance direction component changes, and the magnetic component of the medium 1 to be read (the hard magnetic body 1a) can be detected.

As illustrated in FIG. 15, the optical reading area 201 and the magnetic reading area 202 are equal and co-exist in the same area, and the image information and the magnetic information of the hard magnetic body of the same location can be acquired at the same time. Thus the read optical image and the read magnetic pattern, and the positional relationship of the optical image and the magnetic pattern can be associated. As a result, accurate information can be acquired.

Embodiment 5

Figure 19:
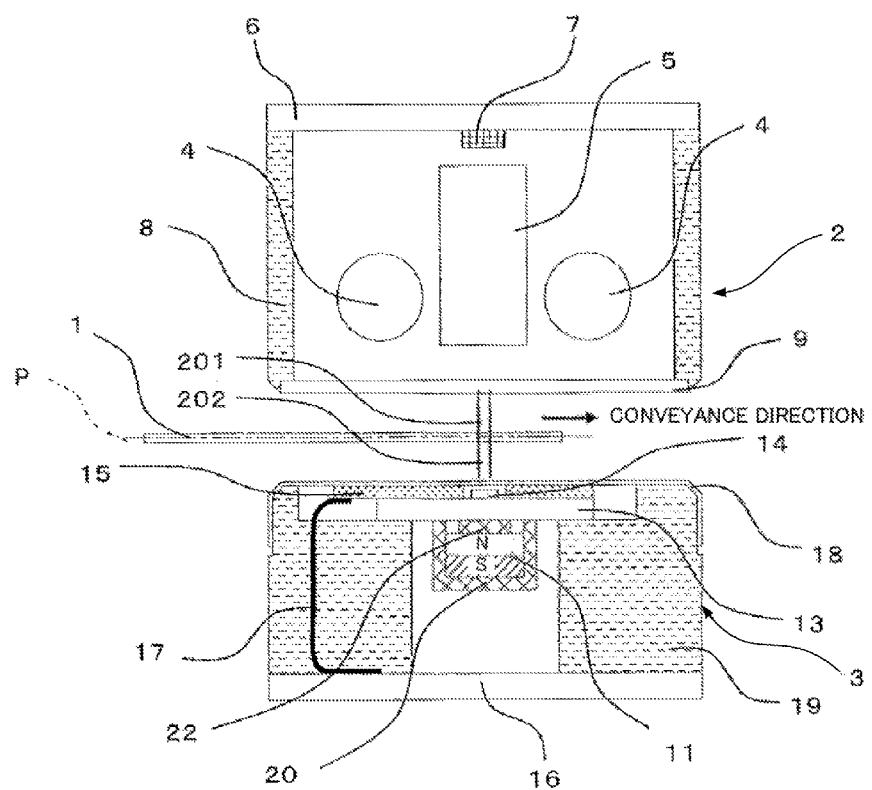
FIG. 19 is a cross section perpendicular to the main scanning direction of an image reading device of Embodiment 5 of the present disclosure.

FIG. 19 is a cross section perpendicular to the main scanning direction of the image reading device of Embodiment 5 of the present disclosure. FIG. 20 is a cross section perpendicular to the main scanning direction of the magnetic reader of Embodiment 5. FIG. 20 is a diagram in which the magnetic reader 3 of FIG. 19 is enlarged. Embodiment 5 is an Embodiment in which the configuration of the magnetic reader 3 in Embodiment 1 is changed, and the configuration of the optical reader 2 is similar to that of Embodiment 1.

The magnetic reader 3 of Embodiment 5 is a configuration, similar to Embodiment 3 and Embodiment 4, in which only a hard magnetic body of the medium 1 to be read is detected. The medium 1 to be read has a hard magnetic body such as a banknote, a check or the like that is formed by containment of a hard magnetic material, or that is printed in ink including a hard magnetic body. In FIG. 19, the magnet 11 has different magnetic poles, a N pole and a S pole that are aligned in the direction (Z direction) perpendicular to the conveyance plane P. The N pole is positioned in the +Z direction and the S pole is positioned in the −Z direction. The yoke 22 is disposed on a surface facing the conveyance plane P of the magnet 11 and the yoke 20 covers portions except the surface on which the yoke 22 of the magnet 11 is disposed and is further disposed to project onto the conveyance plane P side. In FIG. 19, the MR chip 14 is disposed at the center portion of the yoke 22 of the conveyance plane P side of the magnet 11 and the center portion of the conveyance direction length, and between the yoke 22 and the conveyance plane P of the medium 1 to be read.

In the configuration of the magnetic reader 3 of Embodiment 5, the yoke 22 is disposed on the conveyance direction side surface of the N pole side edge portion of the magnet 11, and the yoke 20 is disposed such that the yoke 20 covers portions except the portion facing the yoke 22 of the magnet 11 and projects into the conveyance path side. Therefore, in comparison with Embodiment 4, the magnetic field toward the Z direction beyond the yoke 22 from the magnetic pole further decreases, and the magnetic field toward the X direction further increases.

If the magnetic sensor device is constructed in this way, in comparison way Embodiment 4, the magnetic field applied to the banknote (the hard magnetic body) by the magnet 11, the yoke 22 and the yoke 20 in the vicinity of the MR chip 14 can further be reduced. As a result, as the detection level of the soft magnetic body that does not spontaneously produce a magnetic field further decreases, further distinction between a hard magnetic body and a soft magnetic body becomes possible.

As illustrated in FIG. 19, as the optical reading area 201 and the magnetic reading area 202 are equal and co-exist in the same area and the image information and the magnetic information of the hard magnetic body of the same location can be acquired at the same time. Thus the read optical image and the read magnetic pattern, and the positional relationship of the optical image and the magnetic pattern can be associated. As a result, accurate information can be acquired.

Embodiment 6

Figure 21:
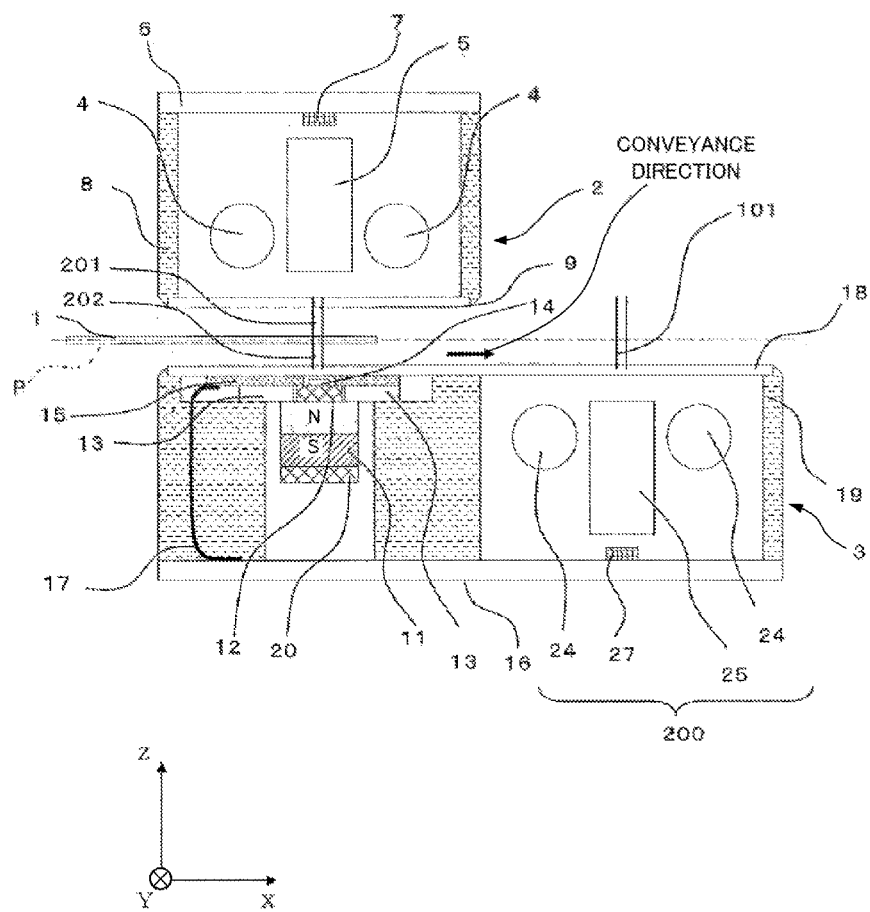
FIG. 21 is a cross section perpendicular to the main scanning direction of an image reading device of Embodiment 6 of the present disclosure.

FIG. 21 is a cross section perpendicular to the main scanning direction of the image reading device of Embodiment 6 of the present disclosure. Embodiment 6 includes an optical reader (a second optical reader) 200 aligned in the conveyance direction of the magnetic reader 3. The image reading device of Embodiment 6 is an image reading device in which an optical reader 200 is added to the configuration of Embodiment 1. The optical reader 200 is disposed on the side of the magnetic reader 3 of the conveyance plane P. The optical reader 200 includes a light guide (second light guide) 24, an image framing optical system (a second image optical system) 25 and a light receiver (second light receiver) 27. The light guide 24, the image forming optical system 25 and the light receiver 27 are equivalent to the light guide 4, the image forming optical system 5, and the light receiver 7 of Embodiment 1 respectively. The light receiver 27 is mounted onto the signal processing board 16. The image forming optical system 25 forms an image of the optical reading area (the second optical reading area) 101 on the magnetic circuit side of the conveyance plane P at the light receiver 27. The signal processing board 16 processes an electrical signal output from the light receiver 27 and acquires an optical image of the optical reading area 101.

In Embodiment 6, in addition to Embodiment 1, the optical realer 200 is disposed on the magnetic reader 3 side of the conveyance plane P. Therefore the image information in the optical reading, area (101) on the magnetic reader 3 side of the medium 1 to be read can also be acquired. Thus, in the image reading device or Embodiment 6, the image information of both sides of the medium 1 to be read can be acquired. As a result, identification precision of the medium 1 to be read further improves.

In addition, any one of the configurations of Embodiments 1, and 3 to 5 may be selected for the magnetic circuit of the magnetic reader 3. In other words, configurations in which the optical reader 200 is assembled in the image reading device of Embodiment 3, Embodiment 4 or Embodiment 5 can be adopted.

Embodiment 7

Figure 22:
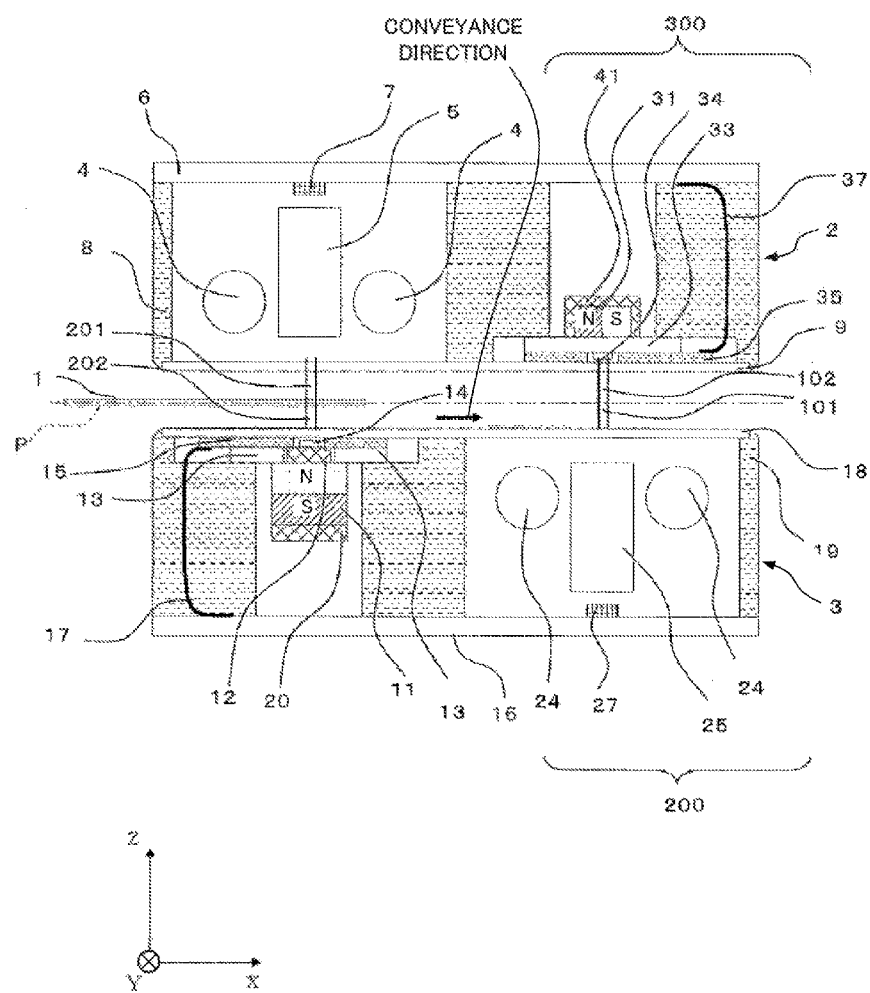
FIG. 22 is a cross section perpendicular to the main scanning direction of an image reading device of Embodiment 7 of the present disclosure.

FIG. 22 is a cross section perpendicular to the main scanning direction of the image reading device of Embodiment 7 of the present disclosure. In addition to the configuration of Embodiment 6, Embodiment 7 includes a magnetic reader (second magnetic reader (hard magnetic body reader)) 300 aligned in the conveyance direction of the optical reader 2. The magnetic reader 300 is disposed on the optical reader 2 side of the conveyance plane P. The magnetic reader 300 includes a magnet 31 in which a N pole and a S pole aligned in the conveyance direction, a yoke 41, a nonmagnetic carrier 33, a magnetoresistive effect element chip (MR chip) 34, and a board 35 connecting an output terminal of the MR chip 34. An electrical signal output from the MR chip 34 is transmitted to the sensor board 6 via the amplifier IC (not illustrated) amplifying the output and the board 35 through the signal line 37. The sensor board 6 processes the electrical signal output from the MR chip 34 and outputs the information of the magnetic patient.

In addition to Embodiment 6, in Embodiment 7, the magnetic reader 300 that detects the hard magnetic body is disposed on the optical reader 2 side of the conveyance plane P. Therefore the information of the soft magnetic body of the magnetic image can be acquired on the magnetic reader 3 side of the medium 1 to be read, and the information of the hard magnetic body can be acquired on the side of the optical reader 2. Thus, the image reading device of Embodiment 7 can acquire not only the image information of both sides of the medium 1 to be read, but also magnetic information of both the soft magnetic body and the hard magnetic body. As a result, identification precision of the medium 1 to be read further improves.

As illustrated in FIG. 22, the optical reading area 101 and the magnetic reading area 102 are equal and co-exist in the same area, and the image information and the magnetic information of the hard magnetic body of the same location can be acquired at the same time. Thus the read optical image and the read magnetic pattern, and the positional relationship of the optical image and the magnetic pattern can be associated. As a result, accurate information can be acquired.

Any one of the configurations of Embodiments 3 to 5 may be selected for the magnetic reader 300 (second magnetic reader). The magnetic reader 300 of Embodiment 7 has a configuration similar to that of the magnetic reader 3 of Embodiment 3. A configuration similar to that of the magnetic reader 3 of Embodiment 4, or Embodiment 5 can be adopted for the magnetic reader 300. In addition, the configuration of the image reading device illustrated in FIG. 22 may be rotated by 180 degrees. The rotated configuration would be the same as the conveyance direction in FIG. 22 being reversed.

If there is no need for reading the image information of the surface on the magnetic reader 3 side of the medium 1 to be read, the optical reader 200 may not be disposed in Embodiment 7. In that case, the magnetic reader 300 may be disposed on the same side as the magnetic reader 3 of the conveyance plane P.

Embodiment 8

Figure 23:
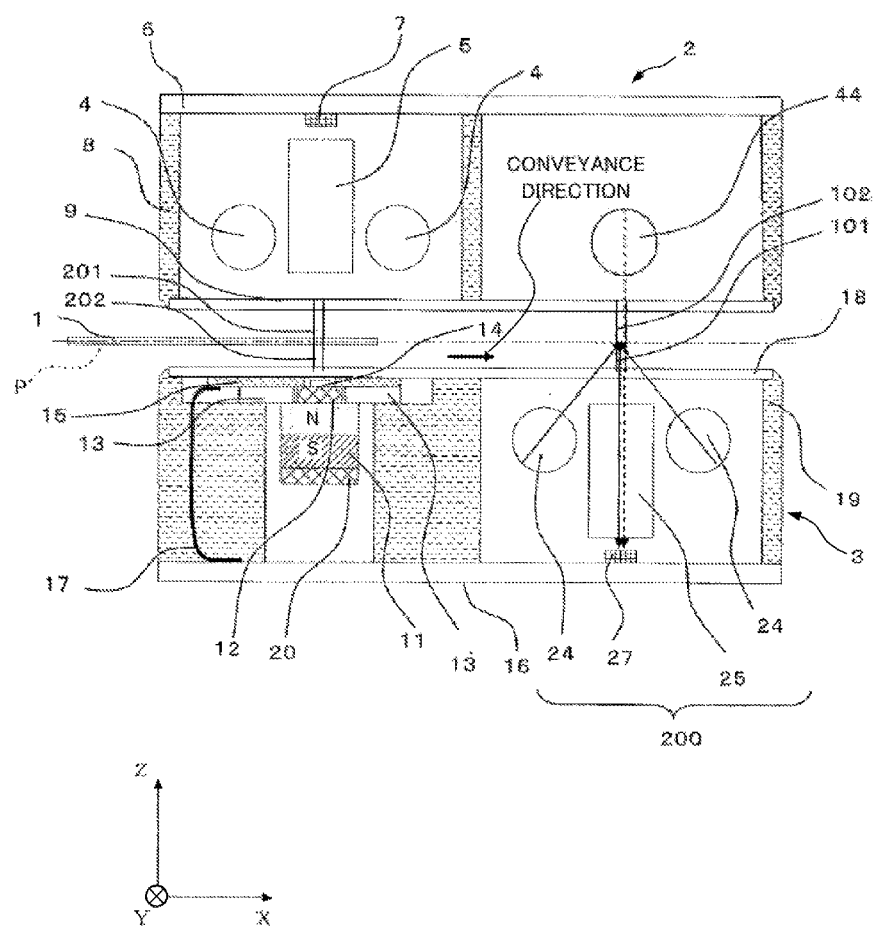
FIG. 23 is a cross section perpendicular to the main scanning direction of an image reading device of Embodiment 8 of the present disclosure.

FIG. 23 is a cross section perpendicular to the main scanning direction of the image reading device of Embodiment 8 of the present disclosure. In addition to the configuration of Embodiment 6, Embodiment 8 includes a light guide (third light guide) 44 in the optical reader 2. The light guide 44 is disposed on the side of the optical reader 2 on the conveyance plane P, that is, the light guide 44 is disposed on the side opposite to the optical reader 200 side with respect to the conveyance plane P. Light of the light guide 44 irradiates onto the opposite side of the optical reader 101 on the conveyance plane P. The optical axis (dashed arrow) of the light guide 44 is identical to the optical axis (solid line arrow) of the image forming optical system 25. In other words, in the image forming optical system 25, the light of the light guide 44 irradiates from the opposite side of the medium 1 to be read. The optical axis of the fight guide 44 (the dashed arrow) and the optical axis (solid line arrow) of the light from the light guide 24 that reflects at the medium 1 to be read and enters the image forming optical system 25 are identical. Thus, the light receiver 27 receives the light from the light guide 24 that reflects at the medium 1 to be read and the light from the light guide 44 transmitted the medium 1 to be read.

In addition to the configuration of Embodiment 6, in Embodiment 8, the light guide 44 that irradiates transmitted light is disposed on the side opposite to the optical reader 200 side with respect to the conveyance plane P. Therefore when the medium 1 to be read has a transparent pattern such as a watermark portion of a banknote, watermark image information of the medium 1 to be read can be acquired using the transmitted light from the light guide 44. Thus, in Embodiment 8, not only the reflection image information of both sides of the medium 1 to be read and the magnetic information of the soft magnetic body but also watermark image information can be acquired. As a result, identification precision of the medium 1 to be read further improves.

If only the acquiring a watermark image using the optical reader 200 is required, the light guide 24 is not required to be disposed. In that case, the image forming optical system 25 and the light receiver 27 may be disposed on the same side as the image forming optical system 25 of the conveyance plane P and the light guide 44 may be disposed on the magnetic reader 3 side of the conveyance plane P.

The configurations of Embodiment 1 through Embodiment 8 are just examples, and the present disclosure is not limited to those configurations. For example, an array of magnetic poles of the magnet 11 or the magnet 31 is not limited to the illustrated examples, and the N pole and the S pole may be reversely arranged in each case. In addition, the conveyance direction of the medium 1 to be read may be reversed in each Embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application is based upon and claims the benefit of priority from Japanese Patent Application No. 2014-204376, filed on Oct. 3, 2014, including the specification, claims, drawings, and the abstract. The entire disclosure of Japanese Patent Application No. 2014-204376 is incorporated by reference herein.

REFERENCE SIGNS LIST

1 Medium to be read
1a Hard magnetic body
1b Hard magnetic body magnetic field
2 Optical reader
3 Magnetic reader
4 Light guide
5 Image forming optical system
6 Sensor board
7 Light receiver
8 Housing
9 Transmission body
11 Magnet
11a Centerline
12 Yoke
13 Nonmagnetic carrier
14 Magnetoresistive effect element chip (MR chip)
14a MR element
15 Board
16 Signal processing board
17 Signal line
18 Cover
19 Housing
20 Yoke
21 Yoke
22 Yoke
23 Magnetic field vector
23a Vertical direction component
23b Conveyance direction component
24 Light guide (second light guide)
25 Image forming optical system (second image forming optical system)
27 Light receiver (second light receiver)
31 Magnet
33 Nonmagnetic carrier
34 Magnetoresistive effect element chip (MR chip)
35 Board
37 Signal line
41 Yoke
44 Light guide (third light guide)
100 Lines of magnetic force (bias magnetic field)
101 Optical reading area (the second optical reading area)
102 Magnetic reading area the second magnetic reading area)
200 Optical reader (second optical reader)
201 Optical reading area
202 Magnetic reading area
300 Magnetic reader (second magnetic reader)
P Conveyance plane

The invention claimed is:

1. An image reading device comprising:
a magnetic circuit configured to generate a magnetic field in a first magnetic reading area on a conveyance plane in a direction perpendicular to the conveyance plane, the magnetic circuit comprising a magnet disposed on one side of the conveyance plane on which a sheet-like medium to be read containing a magnetic component is conveyed along the direction of the sheet surface and the magnet having different magnetic poles in a direction perpendicular to the conveyance plane, and a yoke disposed at the magnetic pole on the side of the conveyance plane of the magnet;
a magnetoresistive effect element configured to detect a strength change of a conveyance direction component of the magnetic field in the first magnetic reading area when the medium to be read is conveyed on the conveyance plane, the magnetoresistive effect element being disposed between the magnetic circuit and the conveyance plane;
a first light source configured to irradiate light onto the first magnetic reading area on the conveyance plane, the first light source being disposed on a side opposite to the magnetic circuit side with respect to the conveyance plane; and
a first image forming optical system and a first light receiver disposed on the side opposite to the magnetic circuit side with respect to the conveyance plane, wherein
the first image forming optical system forms an image of a first optical reading area including at least a portion of the conveyance direction first magnetic reading area on the conveyance plane at the first light receiver.

2. An image reading device comprising:
a magnetic circuit configured to generate a magnetic field in the magnetic reading area on the conveyance plane in a direction parallel to the conveyance direction wherein a sheet-like medium to be read containing a magnetic component is conveyed along the direction of the sheet;

a magnetoresistive effect element configured to detect a strength change of the conveyance direction component of the magnetic field in the magnetic reading area when the medium to be read is conveyed on the conveyance plane, the magnetoresistive effect element being disposed between the magnetic circuit and the conveyance plane;

a first light source configured to irradiate light onto the magnetic reading area on the conveyance plane, the first light source being disposed on a side opposite to the magnetic circuit side with respect to the conveyance plane; and a first image forming optical system and a first light receiver disposed on the side opposite to the magnetic circuit side with respect to the conveyance plane, wherein the first image forming optical system forms an image of a first optical reading area including at least a portion of the conveyance direction magnetic reading area on the conveyance plane at the first light receiver.

3. An image reading device comprising:

a magnetic circuit configured to generate a magnetic field in a magnetic reading area on a conveyance plane in a direction parallel to a conveyance direction, the magnetic circuit comprising a magnet, disposed on one side of the conveyance plane on which a sheet-like medium to be read containing a magnetic component is conveyed along the direction of the sheet and the magnet having different magnetic poles in a direction parallel to the conveyance direction, and a yoke disposed at the both magnetic poles of the magnet;

a magnetoresistive effect element configured to detect a strength change of the conveyance direction component of the magnetic field in the magnetic reading area when the medium to be read is conveyed on the conveyance plane, the magnetoresistive effect element being disposed between the magnetic circuit and the conveyance plane;

a first light source configured to irradiate light onto the magnetic reading area on the conveyance plane, the first light source disposed on a side opposite to the magnetic circuit side with respect to the conveyance plane; and a first image forming optical system and a first light receiver disposed on the side opposite to the magnetic circuit side with respect to the conveyance plane, wherein the first image forming optical system forms an image of a first optical reading area including at least a portion of the conveyance direction magnetic reading area on the conveyance plane at the first light receiver.

4. The image reading device according to claim 1, further comprising:

a second light source configured to irradiate light onto a second optical reading area on the conveyance plane from the side of the magnetic circuit, the second light source being disposed on the side of the magnetic circuit on the conveyance plane; and a second image forming optical system and a second light receiver disposed on the side of the magnetic circuit on the conveyance plane, wherein the second image forming optical system forms an image of the second optical reading area at the second light receiver.

5. The image reading device according to claim 4, further comprising:

a third light source configured to irradiate light having an optical axis same as that of the second image forming optical system from the other side of the second optical reading area on the conveyance plane, the third light source being disposed on a side opposite to the second image forming optical system side with respect to across the conveyance plane.

6. The image reading device according to claim 1, further comprising:

a second magnetic circuit configured to generate a magnetic field in a second magnetic reading area different from the first magnetic reading area on the conveyance plane in a direction parallel to the conveyance direction of the medium to be read; and a second magnetoresistive effect element configured to detect a strength change of the conveyance direction component of the magnetic field in the second magnetic reading area when the medium to be read is conveyed on the conveyance plane, the magnetoresistive effect element being disposed between the second magnetic circuit and the conveyance plane.

7. The image reading device according to claim 6, further comprising:

a second light source configured to irradiate light onto a second optical reading area on the conveyance plane, the second light source being disposed on a side opposite to the second magnetic circuit side with respect to the conveyance plane; and a second image forming optical system and a second light receiver disposed on the side opposite to the second magnetic circuit side with respect to the conveyance plane, wherein the second magnetic circuit and the second magnetoresistive effect element are disposed on the first light receiver side of the conveyance plane, the second image forming optical system forms an image of the second optical reading area including at least a portion of the conveyance direction second magnetic reading area on the conveyance plane at the second light receiver.

8. The image reading device according to claim 2, further comprising:

a second light source configured to irradiate light onto a second optical reading area on the conveyance plane from the side of the magnetic circuit, the second light source being disposed on the side of the magnetic circuit on the conveyance plane; and a second image forming optical system and a second light receiver disposed on the side of the magnetic circuit on the conveyance plane, wherein the second image forming optical system forms an image of the second optical reading area at the second light receiver.

9. The image reading device according to claim 3, further comprising:

a second light source configured to irradiate light onto a second optical reading area on the conveyance plane from the side of the magnetic circuit, the second light source being disposed on the side of the magnetic circuit on the conveyance plane; and a second image forming optical system and a second light receiver disposed on the side of the magnetic circuit on the conveyance plane, wherein the second image forming optical system forms an image of the second optical reading area at the second light receiver.

10. The image reading device according to claim 8, further comprising:
- a third light source configured to irradiate light having an optical axis same as that of the second image forming optical system from the other side of the second optical reading area on the conveyance plane, the third light source being disposed on a side opposite to the second image forming optical system side with respect to the conveyance plane.

11. The image reading device according to claim 9, further comprising:
- a third light source configured to irradiate light having an optical axis same as that of the second image forming optical system from the other side of the second optical reading area on the conveyance plane, the third light source being disposed on a side opposite to the second image forming optical system side with respect to the conveyance plane.

\* \* \* \* \*